UNITED STATES PATENT OFFICE.

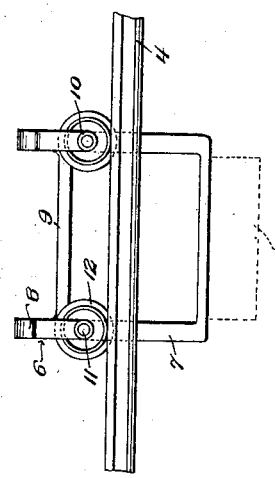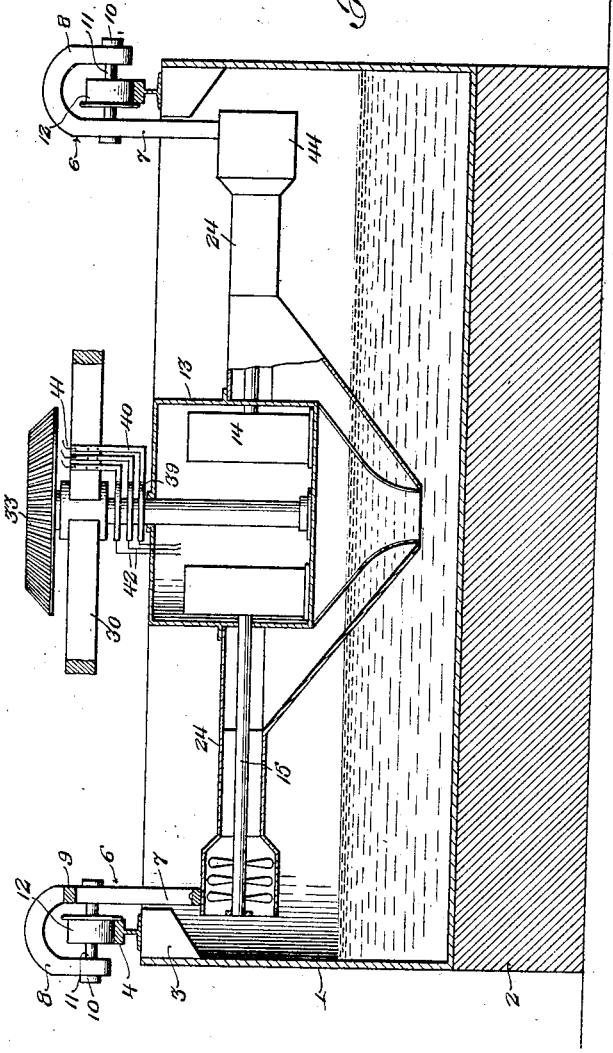

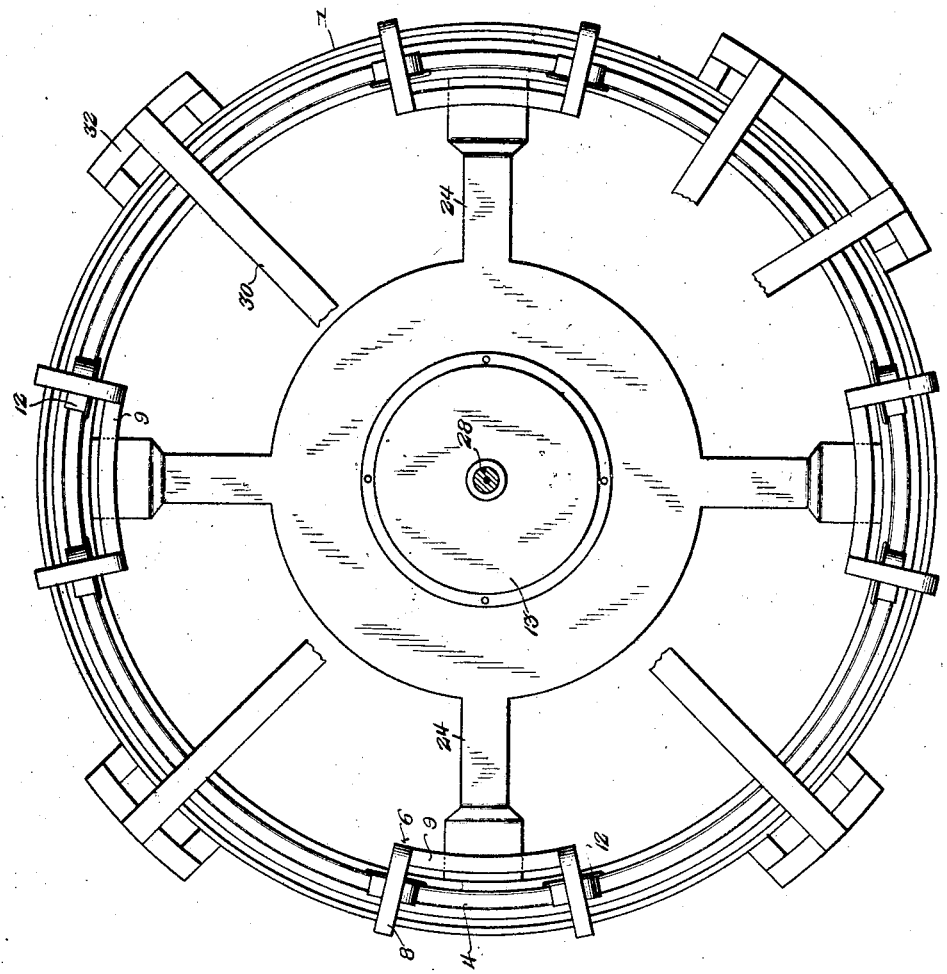

CLINTON H. POOLER, JR., OF RAPID CITY, SOUTH DAKOTA.

POWER-TRANSMISSION APPARATUS.

1,323,095.   Specification of Letters Patent.   Patented Nov. 25, 1919.

Application filed October 12, 1917. Serial No. 196,212.

*To all whom it may concern:*

Be it known that I, CLINTON H. POOLER, Jr., a citizen of the United States, residing at Rapid City, in the county of Pennington and State of South Dakota, have invented new and useful Improvements in Power-Transmission Apparatus, of which the following is a specification.

This invention relates to power transmission apparatus, the object of the invention being to produce simple, practical and economical means for driving one or more electric generators, enabling electric energy to be generated at a comparatively low cost.

A further object of the invention is to produce a machine which will utilize the centrifugal action on water or other liquid for the purpose of driving one or more turbines, from which the power developed thereby is transmitted to the electric generating means.

The invention does away with the necessity of using waterfalls, embodying simple means for imparting the necessary velocity to the water to drive the mechanism above referred to. The principal advantage of the invention resides in the greatly reduced cost in generating electrical energy.

With the above and other objects in view, the invention consists in the novel construction, combination and arrangement of parts, herein described, illustrated and claimed.

In the accompanying drawings:—

Fig. 3 is a fragmentary side elevation showing one of the trucks.

Fig. 4 is a vertical sectional view similar to Fig. 1 showing certain modifications.

Fig. 5 is a plan view of the structure shown in Fig. 4.

Figure 1:
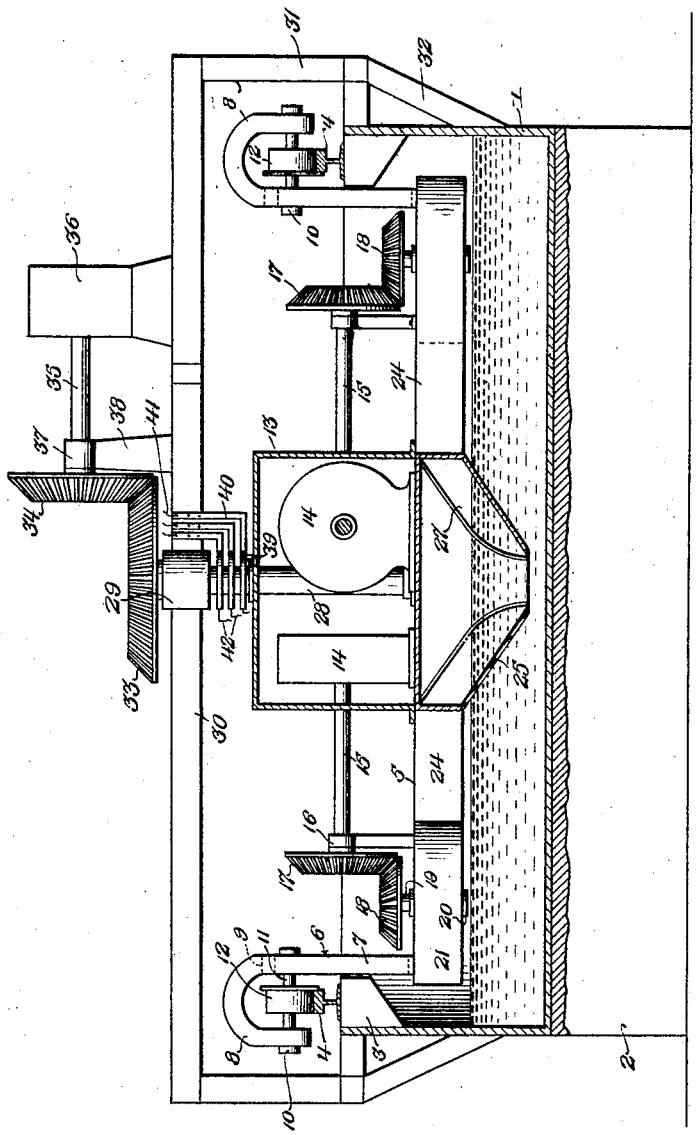
Figure 1 is a vertical sectional view taken about centrally of the machine, with certain parts in elevation.

The improved apparatus or machine comprises as one of the essential features thereof a water reservoir 1 of a size commensurate with the power to be developed. As illustrated in the drawings, the reservoir 1 is mounted upon a solid foundation 2 and is of circular or annular formation.

Supported by the reservoir 1 adjacent to the top edge thereof is an annular rail support 3 upon which is secured a circular track rail 4. Rotatably mounted within the reservoir 1 is a table or platform 5 which is supported by means of a plurality of trucks 6 each of which is shown as comprising a pair of hangers 7 secured to the platform 5 and having their upper ends recurved and extended downwardly as shown at 8 said hangers being connected by cross bars or stringers 9. Journaled in bearings 10 on the hangers 7 are two shafts 11 having flanged wheels or rollers 12 which roll upon the annular track rail 4. In this manner the turn table or platform 5 is supported at a plurality of places and adapted to rotate freely and rapidly with a minimum amount of friction.

Arranged centrally of the platform is a housing 13 shown as containing a plurality of dynamos or electric generators 14. Any desired number of generators 14 may be employed according to the amount of electrical energy to be developed. Each generator 14 is driven by a shaft 15 which extends outwardly through a bearing 16 on the platform 5. The shaft 15 has fast on the other end thereof a bevel gear 17 which meshes with and is driven by a bevel gear 18 on a vertical shaft 19. The shaft 19 is journaled in bearings 20 on the casing 21 of a water wheel or turbine 22 having a plurality of blades 23. The casing 21 is of cylindrical formation and is connected by a conduit or flume 24 with a central frusto-conical water chamber 25 the lower open center of which is always submerged in the water as indicated in Fig. 1. Each of the casings 21 also has an outlet 26 to permit the water to return to the reservoir 1. Therefore the water level in the reservoir is practically constant.

Figure 2:
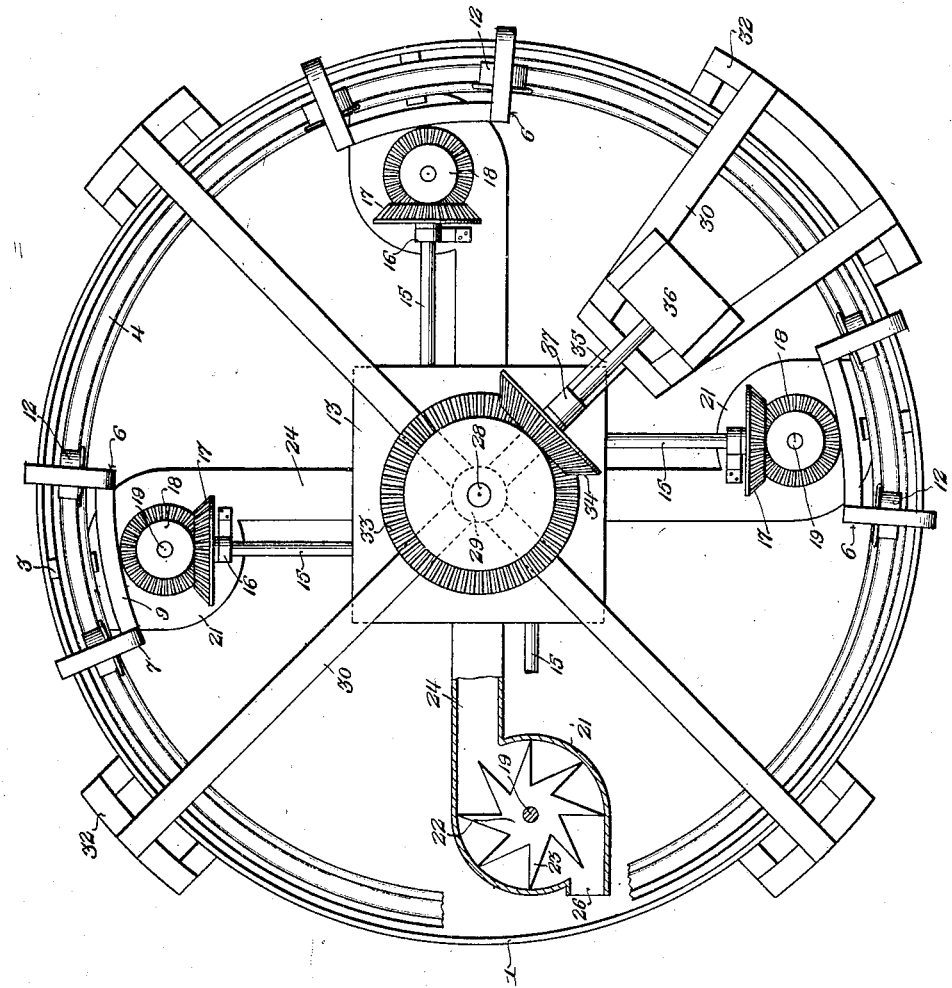
Fig. 2 is a plan view of the machine with parts broken away.

Within the chamber 25 there is arranged a plurality of blades or partitions 27 radiating from a common center as shown in Fig. 2, said blades serving to gather up the water and impart the necessary velocity thereto to cause the water to pass outwardly through the flumes or conduits 24, aided by centrifugal action produced by the rapid rotation of the platform 5. Upon reaching the turbine casings 21, the water under full velocity acts upon the blades of the turbine, imparting rotary motion to said turbines, which in turn transmit their motion to the generators 14 by the connections hereinabove described.

The means for driving the turn table or platform 5, comprises a central vertical shaft 28 secured at its lower end to the platform and extending upwardly through a bearing 29 which is supported by overhead beams 30 which radiate from the bearing 29 and are supported at their outer ends by posts 31 extending upwardly from brackets 32 fastened to the outer side of the reservoir 1 as shown for example in Fig. 1. The shaft 28 has fast thereon a bevel gear 33 which meshes with and is driven by another bevel gear 34 on a horizontal shaft 35 driven by an engine or motor 36 of any suitable description such as an internal combustion engine, said engine being supported by and upon the beams 30. The shaft 35 is journaled in a bearing 37 supported by a pedestal 38 in turn supported by the beams 30. Collector rings 39 surround the shaft 28 and coöperate with brushes 40 from which electrical conductors 41 extend off in order to convey the current generated to any desired point such as a storage battery or any machine to be driven. Lead wires 42 carry the current developed by the generators 14 to the collector rings 39.

Instead of employing the particular form of turbine illustrated in Figs. 1 and 2, the driving means illustrated in Figs. 4 and 5 may be employed. As shown in Figs. 4 and 5, each of the generator driving shafts 15 has fast thereon propeller-like blades 43 which are arranged in casings 44 at the outer ends of the flumes or conduits 24 hereinabove described. This simplifies the construction illustrated in the preceding figures by doing away with the bevel gears 17 and 18 and the vertical shafts 19. Under either construction the water thrown outwardly at great velocity by centrifugal action is used to drive the water wheels or blades or turbines and the power generated thereby is transmitted to the generators 14. The generators are arranged within the water-tight housing 13 above described and are thereby protected from the action of the water. It will be observed that no pumps are required nor any water elevating means which would add to the expense of the apparatus. The water is used over and over again and the level thereof practically remains constant. The flumes may be made of any desired length, it being understood that the longer the flume the greater will be the water pressure on the turbine on account of the increased centrifugal force, and the larger the machine, the slower the speed required to produce a predetermined energy.

I claim:—

1. In power transmission apparatus, the combination of a liquid reservoir, a table mounted for rotative movement therein, means for imparting motion to said table, a liquid receiving chamber depending centrally from said table and submerged in the liquid in the reservoir, liquid propelling means in said chamber, conduits radiating from said liquid chamber, bladed wheels arranged in the path of the liquid moving outwardly through said conduits, and transmission means supported by said table and driven by said bladed wheels.

2. In power transmission apparatus, the combination of a liquid reservoir, a table mounted for rotative movement therein, means for imparting motion to said table, a liquid receiving chamber depending centrally from said table and submerged in the liquid in the reservoir, liquid propelling means in said chamber, conduits radiating from said liquid chamber, and bladed power transmitting wheels arranged in the path of the liquid moving outwardly through said conduits, the liquid passing through said conduits being discharged within said reservoir.

3. In power transmission apparatus, the combination of a liquid reservoir, a table mounted for rotative movement therein, means for imparting motion to said table, a liquid receiving chamber depending centrally from said table and submerged in the liquid in the reservoir, liquid propelling means in said chamber, conduits radiating from said liquid chamber, bladed power transmitting wheels arranged in the path of the liquid moving outwardly through said conduits, and supporting means for said table having rollers which traverse said rail.

4. In power transmission apparatus, the combination of a liquid reservoir, a table mounted for rotative movement therein, means for imparting motion to said table, a liquid receiving chamber depending centrally from said table and submerged in the liquid in the reservoir, liquid propelling means in said chamber, conduits radiating from said liquid chamber, bladed power transmitting wheels arranged in the path of the liquid moving outwardly through said conduits, a circular series of supporting hangers having a fixed relation to said table, rollers journaled in said hangers, and an annular track rail supported by said reservoir upon which said rollers run.

5. In power transmission apparatus, the combination of a liquid reservoir, a table mounted for rotative movement therein, means for imparting motion to said table, a liquid receiving chamber depending centrally from said table and submerged in the liquid in the reservoir, conduits radiating from said liquid chamber, bladed power transmitting wheels arranged in the path of the liquid moving outwardly through said conduits, and liquid actuating blades within said liquid chamber.

6. In power transmission apparatus, the combination of a water reservoir, a water gathering chamber having a portion thereof submerged in said reservoir, flumes radiating from said liquid gathering chamber, water gathering blades in said chamber, means for imparting rotary motion to said chamber and flumes, and power transmitting means actuated by the water passing outwardly through said flumes.

In testimony whereof I affix my signature.

CLINTON H. POOLER, Jr.